US007738151B2

(12) United States Patent
Garner et al.

(10) Patent No.: US 7,738,151 B2
(45) Date of Patent: Jun. 15, 2010

(54) HOLOGRAPHIC PROJECTOR

(75) Inventors: Harold R. Garner, Flower Mound, TX (US); Bala Nagendra Raja Munjuluri, Dallas, TX (US); Michael L. Huebschman, Frisco, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 171 days.

(21) Appl. No.: 11/100,855

(22) Filed: Apr. 7, 2005

(65) Prior Publication Data

US 2005/0286101 A1    Dec. 29, 2005

Related U.S. Application Data

(60) Provisional application No. 60/561,666, filed on Apr. 13, 2004.

(51) Int. Cl.
*G03H 1/08* (2006.01)
*G03H 1/22* (2006.01)
(52) U.S. Cl. .............................................. 359/9; 359/32
(58) Field of Classification Search ................... 359/9, 359/32, 33, 15, 21
See application file for complete search history.

(56) References Cited

U.S. PATENT DOCUMENTS 3,836,230 A * 9/1974 Adams et al. ................ 349/176
5,347,644 A * 9/1994 Sedlmayr ..................... 359/465
5,652,666 A * 7/1997 Florence et al. ................ 359/22
5,739,812 A * 4/1998 Mochizuki et al. .......... 345/163
6,178,018 B1 * 1/2001 Kekas et al. ..................... 359/9
6,195,184 B1 * 2/2001 Chao et al. ..................... 359/32
6,466,372 B1 * 10/2002 Morris et al. ................ 359/567
6,639,685 B1 * 10/2003 Gu et al. ..................... 356/603
6,646,773 B2   11/2003 Garner
2002/0176127 A1 * 11/2002 Garner ......................... 359/35
2005/0237589 A1 * 10/2005 Popovich et al. .............. 359/15

OTHER PUBLICATIONS

PCT International Search Report and Written Opinion of the International Searching Authority, PCT/US05/11671, Nov. 7, 2006.

* cited by examiner

*Primary Examiner*—Stephone B Allen
*Assistant Examiner*—Jade R Calloway
(74) *Attorney, Agent, or Firm*—Daniel J. Chalker; Edwin S. Flores; Chalker Flores, LLP

(57) ABSTRACT

A projection device having a coherent light beam-generator that generates a light beam and a beam expander disposed to receive the light beam and to emit an expanded light beam. The projection device also includes a digital micro-mirror device disposed to receive a holographic transform of an original image and to display the holographic transform for illumination by the expanded light beam into a holographic light beam with a convergent or focusing lens disposed to receive and modulate the holographic light beam and a liquid crystal plate volumetric image reconstructor that receives the focused holographic light beam and emits a 3-dimensional holographic image of the original image.

57 Claims, 4 Drawing Sheets

US 7,738,151 B2

HOLOGRAPHIC PROJECTOR

CROSS REFERENCE TO RELATED APPLICATIONS

This application claims priority to U.S. Provisional Patent Application Ser. No. 60/561,666, filed Apr. 13, 2004, entitled "Holographic Projector," the contents of which are incorporated by reference herein in its entirety.

TECHNICAL FIELD OF THE INVENTION

The present invention relates to an apparatus and method for generating three-dimensional images, and in particular, to devices employing light emitting sources to generate three-dimensional holograms in real-time.

BACKGROUND OF THE INVENTION

Holography is an application of laser technology, best known for its ability to reproduce three-dimensional images. Early holography was limited to using film to record intensity and phase information of light incident on the scene. The principle of operation of film holograms or "stereoscopic photography" is that the film records the interference pattern produced by two coherent beams of light, i.e., "recording beams." One recording beam is scattered from the scene being recorded and one recording beam is a reference beam. The interference patterns recorded on the film encode the scene's appearance from a range of viewpoints. Depending on the arrangement of the recording beams, and therefore the reconstructing and reconstructed beams, with respect to the film, the hologram may be a transmission-type or reflection-type hologram.

One example of a holographic projector that uses two coherent beams of light is described in U.S. Pat. No. 6,646,773, issued to Garner, which teaches an apparatus and method for displaying three-dimensional images. The device creates and displays real-time, three-dimensional moving holograms. A computed image or virtual model of a real object is stored in a computer or dedicated digital signal processor (DSP) and the stored image or model is then converted by the computer or DSP into its Fourier, or holographic, transform. The holographic transform is displayed on a light modulation device that is illuminated by a one portion of a laser emission, while the remaining portion of the same laser emission is combined with the holographic transform at a plane to create a three-dimensional image.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

There remains in the field of holographic projection a need for a display method able to display moving images. Additionally, there remains in the field a need for a display method able to display computer-generated, rather than pre-recorded images. The inventors of the present invention have recognized that known holography methods, when used in combination with modern image-processing algorithms and recent advances in digital light processing technology, can be used to create three-dimensional moving holograms that can be generated and modified "on the fly" by a computer. Alternatively, the interference patterns corresponding to the desired three-dimensional holograms may be pre-computed and recorded on a storage medium, and later played back in real time.

More particularly, the present invention is a projection device and method for generating a hologram using a coherent light beam-generator that generates a light beam, a beam expander disposed to receive the light beam and to emit an expanded light beam, a digital micro-mirror device disposed to receive a holographic transform and to display the holographic transform for illumination by the expanded light beam into a holographic light beam, a convergent lens disposed to focus the holographic light beam and an image reconstructor that receives and emits a holographic image. Examples of image reconstructors that may be used with the single beam hologram include, e.g., a volumetric display that use 1, 2, 4, 6, 8, 16, 32 or more liquid crystal plates, one or more gel tanks, one or more frosted plates or combinations thereof.

Another example of a projection device includes, a coherent light beam-generating device that produces one or more expanded light beams, a processor programmed to generate a holographic transform, a digital micro-mirror device connected to the processor in such manner as to display the holographic transform thereon and disposed to receive an expanded light beam; a convergent lens to focus the holographic light beam that displays the holographic transform; and a volumetric image reconstructor disposed to display the holographic transform.

Another projection device of the present invention uses a coherent light beam-generating device that produces one or more expanded light beams; a digital micro-mirror device connected to a processor in such manner as to display a holographic transform thereon and disposed to receive and reflect the expanded light beam into a holographic beam; and an active image reconstructor that receives the holographic beam and modulates the reflection of the holographic beam. The active image reconstructor includes one or more actively addressable plates. In yet another embodiment, the position or wavelength of the light beam is shifted by less than the width of a mirror on the digital micro-mirror device.

The present invention also includes a method of creating a hologram by generating an expanded light beam, disposing a pattern derived from an image or model on the surface of a digital micro-mirror device disposed to receive the expanded light beam, and generating a modulated light pattern and focusing the modulated light pattern onto an image reconstructor. A time-dependent computed image or virtual model of a real object is stored in, or generated by, a computer or dedicated digital signal processor (DSP). The image or model is then converted by the computer or DSP into its Fourier, or holographic, transform. The holographic transform is displayed on a light modulation device that is illuminated by one portion of a coherent light emission. The remaining portion of the same emission is combined with the holographic transform at a plane to create a three-dimensional image.

Certain embodiments of the present invention employ a digital micro-mirror device for light modulation. Digital micro-mirror devices have an advantage over other known light modulation devices such as liquid crystal displays (LCDs) owing to the fact that micro-mirrors preserve phase coherence of the light, whereas LCDs do not. Because of the high frequencies at which micro-mirrors can be moved, the device of the present invention allows for the creation and display of real-time, three-dimensional moving holograms.

In certain devices embodying the present invention, three-dimensional visual data streams at full video rate without the necessity of higher bandwidth because the data representing the holographic transforms takes only as much bandwidth as normal two-dimensional video. Similarly to two-dimensional video, an increase in the resolution of the digital micro-mirror device increases the resolution of the three-dimensional images displayed. In certain embodiments, the projection device may display in one or more colors through the use of, e.g., a multi-mode laser or multiple lasers. Applications for the projection device of the present invention include, e.g., next-generation television and movie projection, three-dimensional scientific workstations, haptics, interactive volumes, and three-dimensional robotic control displays.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE DRAWINGS

Figure 1:
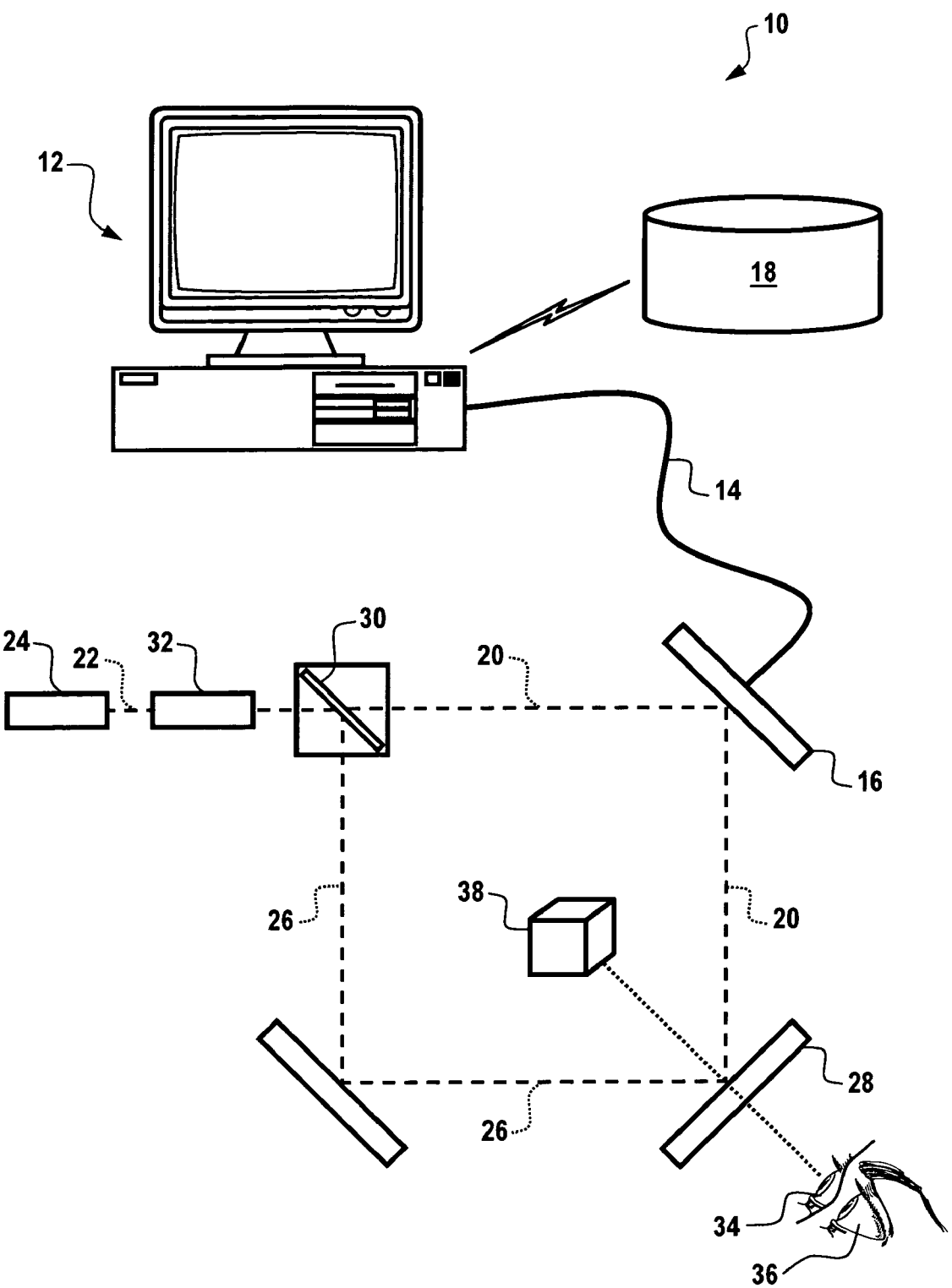
FIG. 1 is a schematic diagram of a prior art three-dimensional display device.

The embodiments and examples set forth herein are presented to best explain the present invention and its practical application and to thereby enable those skilled in the art to make and utilize the invention. Those skilled in the art, however, will recognize that the description and examples are presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The present invention relates to a method and apparatus for display of three-dimensional images. In the present invention, a time-dependent computed image or virtual model of a real object is stored in a computer or dedicated digital signal processor (DSP). The stored image or model is then converted by the computer or DSP into its Fourier, or holographic, transform. The holographic transform is displayed on a light modulation device that is illuminated by one portion of a coherent light emission. The remaining portion of the same light emission is combined with the holographic transform at a plane to create a three-dimensional image. Because of the high frequencies at which modern light amplification devices can be cycled, the device of the present invention allows for the creation and display of real-time, three-dimensional moving holograms.

For a transmission-type hologram, reconstructing the holographic image is accomplished by shining one of the recording beams, as a "reconstructing" beam, through the developed hologram. By diffraction, the recorded interference pattern redirects some of the light to form a replica of the other recording beam. This replica beam, the "reconstructed" beam, travels away from the hologram with the same variation in phase and intensity of the original beam. Thus, for the viewer, the reconstructed wavefront is indistinguishable from the original wavefront, including the three dimensional aspects of the scene.

Holography differs from stereoscopic photography in that the holographic image exhibits full parallax by affording an observer a full range of viewpoints of the image from every angle, both horizontal and vertical, and full perspective, i.e., it affords the viewer a full range of perspectives of the image from every distance from near to far. As such, a hologram contains a much higher level of visual and spatial information as compared to a stereoscopic image having the same resolution. In the same manner that a two-dimensional visual image can be represented in a two-dimensional array of picture elements, or "pixels," a holographic image is often embodied in a three-dimensional array of volume picture elements, or "voxels." A holographic representation of an image thus provides significant advantages over a stereoscopic representation of the same image. The advantage of stereoscopic displays is particularly true in medical diagnosis, where the examination and understanding of volumetric data is critical to proper medical treatment.

While the examination of data that fills a three-dimensional space occurs in all branches of art, science, and engineering, perhaps the most familiar examples involve medical imaging where, for example, Computerized Axial Tomography (CT or CAT), Magnetic Resonance (MR), and other scanning modalities are used to obtain a plurality of cross-sectional images of a human body part. Radiologists, physicians, and patients observe these two-dimensional data "slices" to discern what the two-dimensional data implies about the three-dimensional organs and tissue represented by the data. The integration of a large number of two-dimensional data slices places great strain on the human visual system, even for relatively simple volumetric images. As the organ or tissue under investigation becomes more complex, the ability to properly integrate large amounts of two-dimensional data to produce meaningful and understandable three-dimensional mental images may become overwhelming.

Other systems attempt to replicate a three-dimensional representation of an image by manipulating the "depth cues" associated with visual perception of distances. The depth cues associated with the human visual system may be classified as either physical cues, associated with physiological phenomena, or psychological cues, which are derived by mental processes and predicated upon a person's previous observations of objects and how an object's appearance changes with viewpoint.

The principal physical cues involved in human visual perception include: (1) accommodation (the muscle driven change in focal length of the eye to adapt it to focus on nearer or more distant objects); (2) convergence (the inward swiveling of the eyes so that they are both directed at the same point); (3) motion parallax (the phenomenon whereby objects closer to the viewer move faster across the visual field than more distant objects when the observer's eyes move relative to such objects); and (4) stereo-disparity (the apparent difference in relative position of an object as seen by each eye as a result of the separation of the two eyes).

The principal psychological cues include: (1) changes in shading, shadowing, texture, and color of an object as it moves relative to the observer; (2) obscuration of distant objects blocked by closer objects lying in the same line of sight; (3) linear perspective (a phenomenon whereby parallel lines appear to grow closer together as they recede into the distance); and (4) knowledge and understanding that is either remembered or deduced from previous observations of the same or similar objects.

The various psychological cues may be effectively manipulated to create the illusion of depth. Thus, the brain can be tricked into perceiving depth which does not actually exist. Physical depth cues are not subject to such manipulation; the physical depth cues, while generally limited to near-range observation, accurately convey information relating to an image. For example, the physical depth cues are used to perceive depth when looking at objects in a small room. The psychological depth cues, however, must be employed to perceive depth when viewing a photograph or painting (i.e., a planar depiction) of the same room. While the relative positions of the objects in the photograph may perhaps be unambiguously perceived through the psychological depth cues, the physical depth cues nonetheless continue to report that the photograph or painting is merely a two-dimensional representation of a three-dimensional space.

Stereo systems depend on image pairs each produced at slightly different perspectives. The differences in the images are interpreted by the visual system (using the psychological cues) as being due to relative size, shape, and position of the objects and thus create the illusion of depth. A hologram, on the other hand, does not require the psychological cues to overrule the physical depth cues in order to create the illusion of a three-dimensional image; rather, a hologram produces an actual three-dimensional image.

Conventional holographic theory and practice teach that a hologram is a true three-dimensional record of the interaction of two beams of coherent, i.e., mutually correlated light, in the form of a microscopic pattern of interference fringes in a film. More particularly, a reference beam of light is directed at the film substrate at a predetermined angle with respect to the film. An object beam, which is either reflected off of or shines through the object to be recorded, is generally normally (orthogonally) incident to the film. Reference and object beams interact within the volume of space occupied by the film and, as a result of the coherent nature of the beams, produce a standing (static) wave pattern within the film. The standing interference pattern selectively exposes light sensitive elements within the photographic emulsion making up the film, resulting in a pattern of alternating light and dark lines known as interference fringes. The fringe pattern, being a product of the standing wave front produced by the interference between the reference and object beams, literally encodes the amplitude and phase information of the standing wave front. When the hologram is properly re-illuminated, the amplitude and phase information encoded in the fringe pattern is replayed in free space, producing a true three-dimensional image of the object.

Conventional holographic theory further suggests that a sharp, well-defined fringe pattern produces a sharp, bright hologram, and that an overly strong object beam will act like one or more secondary reference beams causing multiple fringe patterns to form (intermodulation) and diluting the strength of the primary fringe pattern. Accordingly, holographers typically employ a reference beam having an amplitude at the film surface approximately five to eight times that of the object beam to promote the formation of a single high contrast pattern within the interference fringe pattern and to reduce spurious noise resulting from bright spots associated with the object. In general, the resolution of the fringe pixel density determines the resolution of the final image.

Since known holographic techniques generally surround the recording of a single hologram or, alternatively, up to two or three holograms, within a single region of the emulsion making up the film substrate, the stated objective is to produce the strongest fringe pattern possible to ensure the brightest holographic display. Accordingly, holographers typically expose a large number of photosensitive grains within the film emulsion while the object is being exposed. Since every point within the holographic film includes part of a fringe pattern that embodies information about every visible point on the object, fringe patterns exist throughout the entire volume of the film emulsion, regardless of the configuration of the object or image which is the subject of the hologram.

As a consequence of the above, the creation of strong, high contrast fringe patterns necessarily results in rapid consumption of the finite quantity of photosensitive elements within the emulsion, thereby limiting the number of high contrast holograms that can be produced on a single film substrate to two or three. Some holographers have suggested theoretically that as many as 10 to 12 different holographic images may be recorded on a single film substrate; superimposing more than a small finite number of holograms have not been considered generally possible in the context of conventional hologram theory. Known holographic display methods are useful primarily for the display of static images. Additionally, known holographic display devices are useful primarily for the display of recorded images. Accordingly, there remains in the field of holographic projection a need for a display method able to display moving images. Additionally, there remains in the field a need for a display method able to display real-time computer-generated, rather than pre-recorded, three-dimensional images.

FIG. 1 is a schematic diagram of a three-dimensional display device 10 of the prior art. As seen in prior art FIG. 1, a three-dimensional display device 10 includes a computer 12 connected operably by link 14 to a digital micro-mirror device (DMD) 16. The display device incorporates DMD 16 for light modulation, other light modulation devices will be known to those of skill in the art. As shown in FIG. 1, a computer 12 generates holographic transforms from images stored in data storage unit 18, which are then sent to the DMD 16 through link 14. Holographic transforms are computed using a Fourier transform algorithm, e.g., using dedicated digital signal processor for computing Fourier transforms or be reading and projecting pre-computed transforms previously transformed and recorded on a storage medium such as a DVD. The DMD 16 is illuminated by an illumination beam 20, which is a first portion of the beam 22 emitted by light source 24. A reference beam 26, which is the second portion of the beam 22, is directed to the imaging plane 28 by beam splitter 30. In various embodiments, beam splitter 30 may incorporate one or more beam-splitting cubes, one or more wave plates, and one or more mirrors. As is known in the art, the beam powers of the two beams 20 and 26 could be similar or significantly different, such as the power of beam 20 being significantly greater than or less than the power of beam 26.

In FIG. 1 optics group 32 is positioned between the laser 24 and the beam splitter 30 for the dual-beam holographic projector. The optics group 32 may incorporate conditioning optics, a beam expander, a color wheel, an RF modulator or other elements. Polarizers, lenses, mirrors, diffraction gratings, apertures, half-wave plates, or filters of various types may be employed to condition, focus and direct the light from light source 24 to beam splitter 30. Illumination beam 20 and reference beam 26 are focused and directed to the same point on the imaging plane 28. The imaging plane 28 may be one surface of a transparent or translucent plate. Imaging plane 28 may be a photo-refractive material and may incorporate short-duration image-retention or phosphorescent elements or materials including short to long phosphor materials. With such an arrangement, the illumination beam 20 and reference beam 26 will form an interference pattern, which will be viewed by human eyes 34 and 36 as a three-dimensional image 38 disposed on the opposite side of imaging plane 28.

Figure 2:
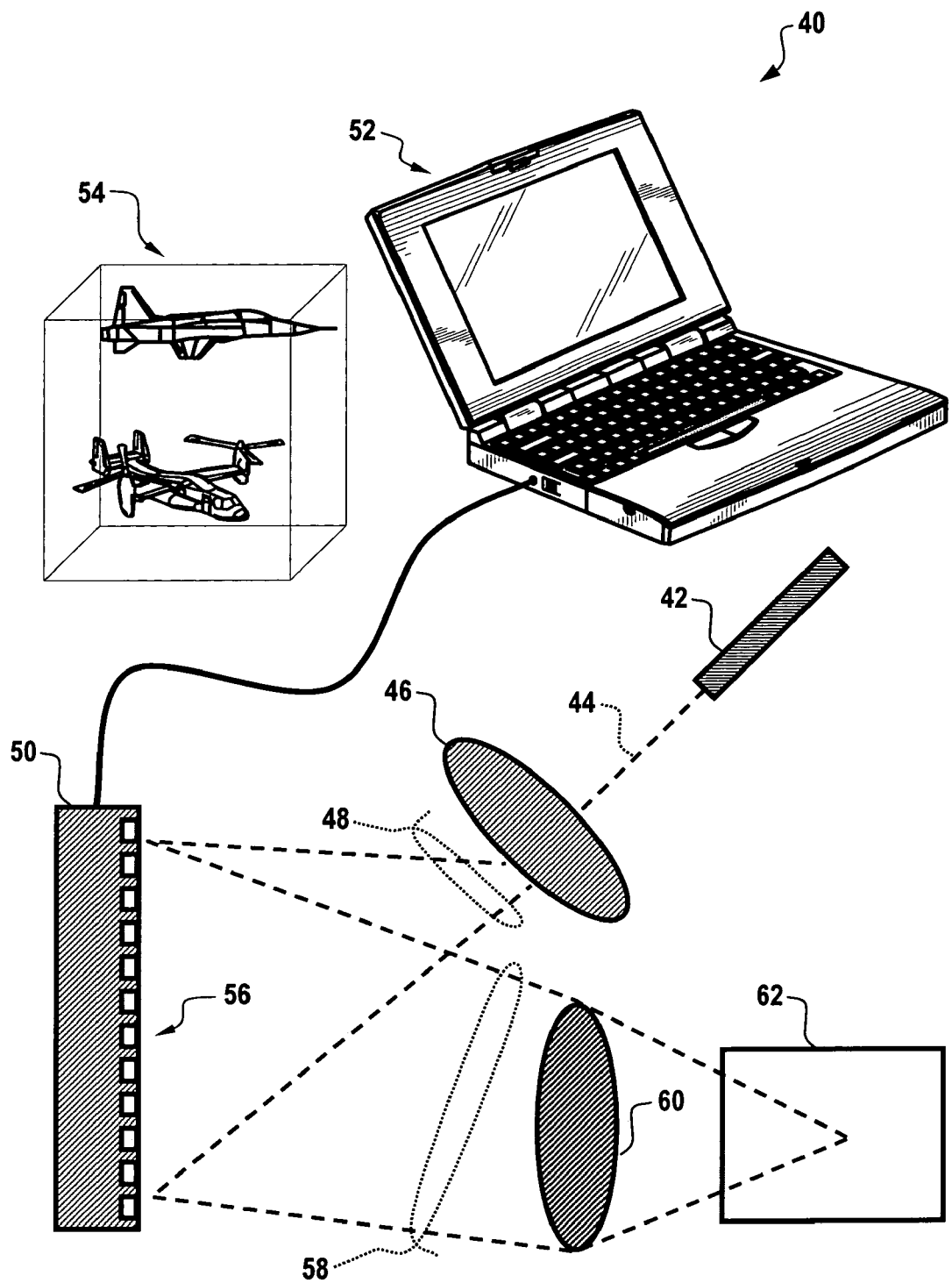
FIG. 2 is an isometric diagram of a holographic projector according to one embodiment of the present invention.

The present invention is shown in FIG. 2. A holographic projector 40 is depicted with a single light source 42 that generates a light beam 44 that is received by and transmitted through beam expander optics 46, thereby generating an expanded light beam 48. The skilled artisan will recognize that a wide variety of light generators may be used as a light source 42 as described herein below. Furthermore, multiple light generators (e.g., one red, one green and one blue) may be used to provide a full-range of color. The expanded light beam 48 that passed through beam expander optics 46 is reflected by a spatial light modulator 50, e.g., a DMD. While the beam expander optics 46 are depicted as a single lens, the skilled artisan will recognize the such optics may be reflective optics and may include one or more optical elements, including reflective and refractive optics. The spatial light modulator 50 is connected to a computer 52 that has the coordinates of an original image 54 and which is transmitted to the reflective surface 56 of the spatial light modulator 50 to generate a holographic light beam 58 that is received by and transmitted through a convergent or focusing lens 60, such that the holographic light beam is directed to an image reconstructor 62. The image reconstructor 62 may be one or more frosted plates, one or more gel tanks and/or one or more liquid crystal plates.

In one embodiment the image reconstuctor 62 is an active image reconstructor. By "active image reconstructor" it is meant that the image reconstructor may be under the control of a processor to provide a surface that is reflective, transparent and/or opaque. One example of an active image reconstructor 62 may include 1, 2, 4, 6, 8, 16, 32 or more liquid crystal plates that are also connected to a processor, e.g., a dedicated digital signal processor.

Light source 42 may be any one of a variety of light generating devices, and may incorporate a combination of separate light sources acting together. In certain embodiments, the light source 42 is one or more laser light sources. In various embodiments, white lasers, argon-gas lasers, Helium-Neon, diode, YAG or ruby lasers could be employed.

In one embodiment, the present invention employs a single solid-state laser, either alone or in combination with other elements, for the light source 42. Diode-pumped solid-state lasers are known to be efficient, compact and reliable sources of high beam quality optical radiation. The group of solid-state lasers includes neodymium and ruby lasers, but there are many variations. In one embodiment of the present invention, a diode laser may be employed to optically pump a solid-state laser rod of ruby, neodymium-YAG, neodymium-glass, titanium-sapphire, alexandrite, lithium compounds or the like. In another embodiment, the system may be adapted to accept any solid-state laser generator or any gas laser including helium-neon, an ion laser such as an argon laser, krypton laser, xenon laser, or a molecular laser such as a carbon dioxide laser or excimer laser.

The 3-D holographic imaging projector and system disclosed herein provides real-time, dynamic, true 3-D viewing. A hologram contains 3-D information in 2-D format, therefore, a 3-D scene may be transmitted around the world as a single 1-MB, 2-D hologram image may be the equivalent of 10 to 100, 1-MB, 2-D scene images for the reconstruction. Therefore, a hologram reduces bandwidth requirements while still allowing use of existing 2-D image data transmission infrastructure. There are trade-offs for each approach, e.g., bandwidth and resolution or video-refresh rate.

To display 2-D images as 3-D, one approach requires that each pixel in each of 10 to 100 1-megapixel LCD-screen layers be addressed and each layer sequenced in accordance with the proper depth location of the 2-D image in the 3-D scene, requiring complex hardware and software. Another approach first takes the information from each of 10 to 100 2-D scenes and converts it to 3-D coordinates; the correct number and location of each voxel (the volumetric equivalent of a pixel) to display is then calculated and projected at the precise time on a time-dependent medium—a translating or rotating plate or liquid-crystal panel, for example. However, displaying a true 3-D hologram requires only a coherent light source and the viewer's eye for virtual-image viewing (visualizing the 3-D object by peering through film or the DMD) or a volumetric medium for real-image projection.

Spatial light modulators have been used to write holograms on recording materials, but using the spatial modulator directly as the holographic medium is key for real-time dynamic display. While liquid-crystal displays (LCDs) have already been used to create virtual holographic images, our team has now shown that a DMD can also be used to create virtual holographic images. Because the reflected intensity of a DMD always greatly exceeds the transmission intensity of an LCD spatial light modulator, however, real-image holographic projection is more practical with the DMD.

Applications for DMD holograms include the same applications as for 2-D perspective displays, stereoscopic displays, multiple-layer 2-D displays, and digital voxel projection on spinning plates, as well as some applications that are unique to the interferometric nature of the hologram. In addition to applications for measuring surface deformations, instruments that use waves, like radar or sonar, have an intrinsic capability to produce holograms. Adding the technology to provide the digital holograms from the interference of the return waves of these instruments would allow real-time redisplay of the 3-D objects using the DMD and visible laser light.

| Application | Image Quality | Viewing Image |
|---|---|---|
| 3D Heads Up Display Without Goggles[1]; Air Traffic Control[1]; Orbital Displays[1]; 3D Multiplayer Games[1]; Real Time Maritime Navigation Viewers[1]; Remotely Piloted Aircraft or Vehicle[1] | Current | Virtual |
| Sonar Visualization[2]; Sonograms[2] | Current | Virtual |
| Battle Simulations[1,3]; Flight Simulators[1,3] | Improved | Real |
| 3D Scientific Displays[1,3] Holographic Movies[1,3]; 3D Multiplayer Games[1]; Theme Park Displays[1] | Improved | Real/Virtual |

-continued

| Application | Image Quality | Viewing Image |
|---|---|---|
| Visualization of Living Bodies[3]; MRI[3]; Surgery[3]; Plastic Surgery Post Operative Modeling[3]; Chest Deformation[3]; Measurement on Teeth and Bones[3], etc. | Improved | Virtual |
| Visualization of Long Wave (SLAR, FLIR, LIDAR, Radar, etc) Surveillance[2]; Visualization of Short Wavelength (x-ray, electron beam, etc) Scanning[2]; MRI[2,3]; Surgery[2,3]; Overlays during Surgery[2,3]; Teaching Surgery[2,3]; Testing of Urinary Track[2,3]; Measurement on Eyes, Ears[2,3], etc. | Improved to High | Virtual/Real |
| Holographic TV[4] | High Definition | Real |

Hologram Type:
[1]Computer Generated,
[2]Intrinsic,
[3]Recorded and Stored,
[4]Recorded and Transmitted Table 1 summarizes the applications for the present invention in 3D holographic volumetric image displays parallels those for 2D perspective displays and 2D sequenced volumetric displays. The second column represents an estimate of time frame when a commercial product could be available. Image Quality column: Current—today's resolution; Improved-improved resolution, larger images and sharper clarity; High-resolution and clarity to match current film quality; High Definition-resolution, sharpness, clarity and size to match high definition TV.

Although DMD holographic resolution is very good, some applications do not require actual images or high resolution. For instance, a heads-up display of the 3D aircraft in space need only provide a recorded, relatively "crude" image displayed in true 3D to present the pilot with the information for proper orientation perception. Currently, air traffic controllers view radar symbols on a 2D screen and would benefit from 3D positioning of low-resolution icons.

Table 2 summarizes the resolution of current DMDs and the advantage of grouping multiple DMDs together. By reducing the size of the DMD mirrors, the size of the best image can be increased. By grouping arrays together, the resolution can also be improved. Even with the 17 micron mirror SVGA array DMD, the minimum possible resolution of an image projected at 1 meter is a more than adequate 0.038 mm. But the image size will only be about 3 cm which is hard to view without magnification. The specifications for DMD generated dynamic holograms improve with advancing technology. Standard digital image processing calculations for 500 nm wavelength light and shortest array length.

| DMD Size | Min. Spatial Resolution (mrad) | Max. Image Size (mrad) |
|---|---|---|
| 17 micron Mirrors 1024 × 768 Array | 0.0383 | 29.4 |
| Square of 4 of the DMDs above | 0.0191 | 29.4 |
| 13 micron Mirrors 1024 × 768 Array | 0.050 | 38.5 |
| Square of 4 of the DMDs above | 0.025 | 38.5 |

Both a virtual image viewer and a prototype real image projector workstation are being developed. Although they feel the fundamentals of real 3D image projection have been demonstrated using the DMD, the technology available for volumetric display is lagging. Without a method for high quality volumetric display, the striking affects of a true 3D scene are lost to the observer. They have added to their investigations the development of volumetric display systems with the characteristics that the system remains simple, sturdy and low cost.

Figure 3:
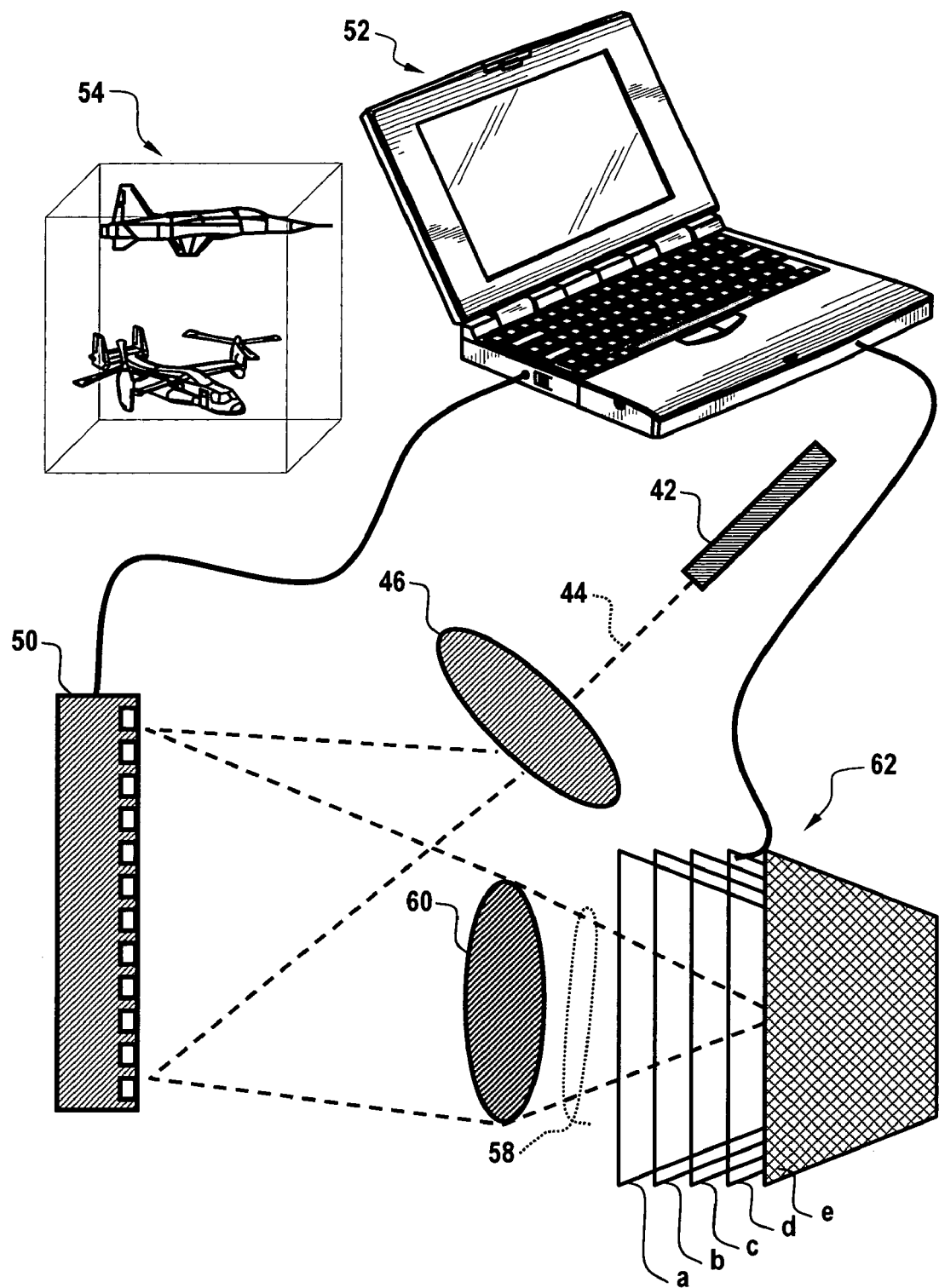
FIG. 3 is a schematic diagram of an active, volumetric display of the present invention.

FIG. 3 shows another embodiment of the 3D holographic imager in which the image reconstructor 62 includes plates 62a to 62e. In FIG. 3, plates 62a to 62e are depicted as liquid crystal plates that are under the control of computer 52. As shown, plates 62a to 62d are transparent thereby permitting the holographic light beam 58 to traverse plates 62a to 62d, while plate 62e is shown as opaque. When the light beam strikes the opaque portion of the plate light is reflected to show, e.g., a dot or square that is visible to the viewer. The plates may contain individually addressable pixels that are turned on and off by a processor. In this "active" version of the image reconstructor 62, the holographic image is controlled by two main surfaces that of the spatial light modulator 50 and that of the plates 62a to 62e at locations throughout the plates. The number of locations will vary by the number of individually addressable locations, e.g., from a single location to millions of locations, in any shape (square, circular, oval, hexagonal, etc.) with varying refresh speeds, etc. As used herein the term "refresh speed" refers to the ability of a surface or volume to cycle from, e.g., a mostly opaque to mostly transparent back to mostly opaque state or a mostly reflective to mostly non-reflective back to reflective, from the point of view of an observer at a relatively fixed location.

Figure 4:
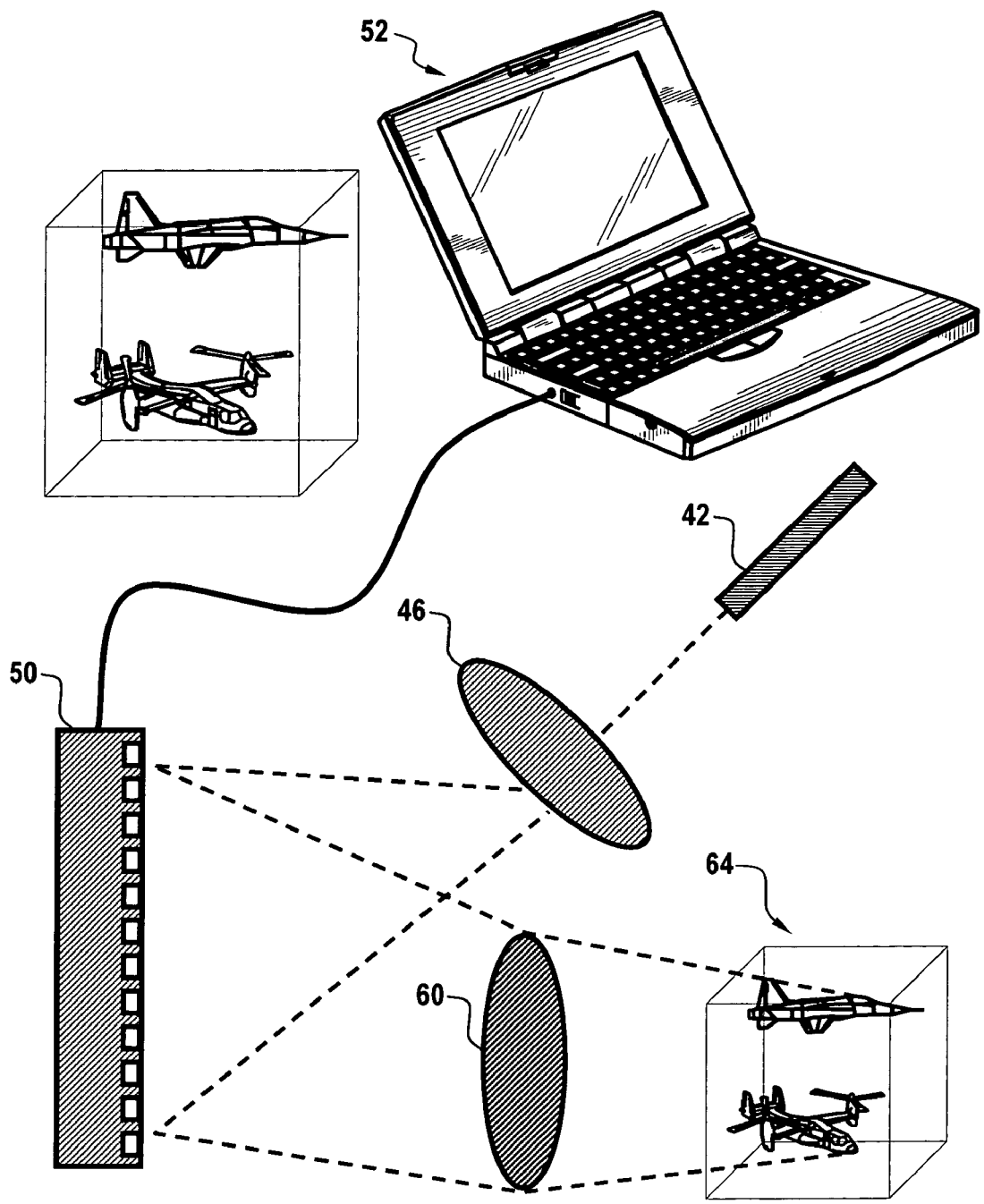
FIG. 4 is a schematic diagram of a gel tank volumetric display of the present invention.

FIG. 4 is another embodiment of the present invention wherein a gel tank 64 is depicted as providing the image reconstruction. The gel may be made of a number of materials, not unlike those materials used in frosted plates for light capture and reflection. The gel in gel tank 64 may incorporate a photo-refractive material and may incorporate short-duration image-retention or phosphorescent elements or materials including short to long phosphor materials.

For multi-color 3D projectors, two color lasers, filtering and collimating optics, are used with one or more DMDs and focusing lens. The computer displays one or more holograms on the DMD, e.g., side by side, in quadrants and the like. The multiple color display may use a partitioned DMD for each color laser and use a single hologram equaling partitioned with the hologram for the color. Thus, there are no mechanical shutters in the setup that may cause, e.g., flicker. One such projection system uses a depth of 8 liquid crystal sheets;

however, a volumetric display may include a number of sheets, e.g., 32 liquid crystal sheets.

The volumetric display uses multiple layers of single-element liquid crystal sheets to build the volume. The liquid crystal sheets (available from, e.g., LTI Smart Glass, Inc., USA) are clear when a voltage is applied and opaque without a voltage. The LCD layers are "on" or clear most of the time and are asynchronously sequenced "off" or opaque at programmed intervals. One of the advantages of liquid crystal sheets is that they eliminates most of the scattering of a continuous medium (e.g., a gel) and enhances the in-focus parts of the 3D images at each layer as it is turned off. By sequencing the layers off and on faster than the eye can see, flicker is eliminated as the eye integrates the entire 3D scene. FIG. 3 shows a picture of a holographic image projected through the 5 layers of the display, each layer may be separated by, e.g., 4.6 mm. Using liquid crystal layers, a dynamic holographic image may be projected through the 5-layer liquid crystal volumetric display. Depending on the required resolution, use, viewing requirements, and the like, a wide variety of viewable areas (in both two and three dimensions) may be designed, e.g., an area that is 3, 5, 10, 15, 20, 30, 50 or even 100 cm or even meters per side.

In this embodiment, it has been found that any apparent fuzziness of a projected holographic image is more an effect of the refresh rate of the liquid crystal sheets than a lack of inherent resolution of the DMD. The fade time of the opacity of the LC sheets used was approximately ~10 ms, which is relatively long and also affect sharpness and refresh time. To optimize the image, which will depend on the desired use (e.g., heads-op goggles to projections TVs), the optimal power conditioning circuit, software, liquid display hardware, number of liquid display layers, number of colors, etc., may be optimized to increase the sharpness of the display. An example of volumetric expansion of the image reconstructor or display is to use, e.g., 32 liquid crystal sheets thereby providing a 6"×6"×6" volume when the optimal power conditioning design is completed.

In addition to work on holographic projection display hardware, improved software that is tailored for specific DMDs (depending on mirror size, refresh rate, intended use, mirror number, DMD surface area, etc.) may be developed to improve the quality of the image for the generated holograms. A near real-time update algorithm that enables applications heads-up displays and air traffic control has been demonstrated.

One such algorithm is based on the "look-up" table approach, in which spatially independent holographic terms for every object used in a simulation are computed and stored prior to projection. Then, during real-time operation, the hologram of an object at a changing location in a 3D scene is computed using the corresponding pre-computed terms. For example, using a single, medium speed processor, the time required to initially compute the spatially independent terms for an object made up of 1000 pixels is approximately 7 minutes and may be calculated off-line. But once completed, to translate the object in the 3D scene from one position to another or add a new object to the 3D scene takes approximately 0.8 seconds using a computer running at a mere with 1.8 GHz Intel Pentium IV processor with just 512 MB RAM.

The present invention may be used in conjunction with grating effects of the DMD which produce multiple orders of images, depth of focus issues, and evaluating advantages and disadvantages to using the real image projector or the virtual image viewer for particular applications. Furthermore, a library of computer-generated holograms of simulated scenarios in various applications may be provided with the device to reduce greatly or eliminate image display.

In certain applications, a Fourier transform method may be based on what is known as a discrete Fourier transform, or DFT, where a signal response is measured in terms of discrete harmonics determined by a sequence of equally spaced samples. A discrete Fourier transform generally requires a large number of calculations. In particular, for N measured data points, N*N transform coefficients must be calculated. Consequently, for large data sets, the discrete transform process may take a long time to complete the calculation.

Accordingly, certain embodiments of the present invention may employ the Fast Fourier Transform, or FFT, algorithm, developed by J. W. Cooly and J. W. Tukey. The FFT algorithm reduces the number of calculations required to obtain a result. In essence, an FFT algorithm reduces the number of calculations of a typical DFT by eliminating redundant operations when dealing with Fourier series, thereby sacrificing a certain level of accuracy in exchange for a substantial reduction in processing time. The number of operations required to calculate an FFT for N data samples is represented by N log.sub.2 N. Thus, the FFT requires significantly fewer calculations than that required in the DFT, and for large data arrays, the FFT is considerably faster than the conventional DFT.

Alternate embodiments of the present invention may employ other Fourier transfer algorithms. One example of such an algorithm is the Chirp Z transform, which is an improved version of FFT that can perform a Fourier transform having a higher resolution than that of the FFT. This Fourier transform method is described by Rabiner and Gold in "Theory and Application of Digital Signal Processing", pages 393-398, 1975. As far as transformation time is concerned, since the Chirp Z transform process typically carries out the FFT process three times, the Chirp Z transform requires a longer Fourier transformation time than that required for the traditional FFT process.

Yet another embodiment of the present invention is to shift the position or wavelength of the laser beam slightly so that it is equivalent to a fraction of a mirror size. The hologram that is on the DMD will also have been recomputed for the new position/wavelength and then when it is synchronously illuminated it will paint voxels in between those that are there from the previous frame/illumination combination. This hologram works because the eye will integrate over the new positions/wavelengths to make it appear to be higher resolution. The DMD has plenty of switching bandwidth (i.e., it can change its image very fast, about 30 microseconds). For example, when using a monochrome display, the rapid switching of the DMD is used at, e.g., the 3× rate that normally handles color, but instead of putting the computed image for RGB (Red/Green/Blue), and the switching capability of the DMD is used to achieve the necessary enhancement in hologram resolution. In fact, in another embodiment, there is no need to sacrifice the color by using the excess bandwidth on the DMD or to run it with a slightly slower total refresh. It is not expected that using the excess bandwidth with a shifted wavelength laser beam will introduce flicker, because of the rapid refresh frequency, which is faster than the eye integrates.

The enhancement in resolution may be accomplished in a number of different ways, e.g., by translating physically the beam position or illumination angle to the DMD, the DMD itself or slightly shifting the wavelength (using 633 nm HeNe laser or 660 nm solid state laser, for example). By shifting the beam direction (angle) or position such that the position is moved a fraction of a mirror, for example one half of a mirror or 17/2 microns, then the resolution is doubled. Therefore, the beam may be translated using simple, rigid parts such as piezoelectric actuators on optical components, multiple beams in different solid state devices or in a single device, or other electro-optical components. As the skilled artisan will appreciate, the same or similar effect can be obtained using slightly different wavelengths from different lasers or frequency shifting components. The slightly different wavelengths may result in different positions on which the reconstruction is done and thus again enhancing the resolution.

Furthermore, as better resolution translated into better images, the laser/mirror shifted output provides an improved visual object than may be reconstructed in a larger format, without sacrificing image quality. Since improved holograms can be imaged using the color channels or by being slightly slower in image motion rate (but generally without flicker), it can still take advantage of the existing transmission infrastructure, without the need for new bandwidth from the DMD. Dramatically increase resolution may be achieved as additional bandwidth is created in the DMDs, not unlike several adjacent video channels, i.e., resolution enhancement of this type is not limited.

As will be appreciated by those of skill in the art, the teachings of the present invention may be employed in a variety of contexts. The present invention may be employed for recreational uses including the creation of, for example: real-time three-dimensional television, moving pictures, video games, virtual reality simulations, or planetarium displays, holograms embodied in the form of holographic films, as examples. The present invention may also be employed in the medical and scientific context, for the viewing of, for example: computed tomography (CT), x-ray, ultrasound, magnetic resonance imaging data, or magnified electron microscope images. In addition to the imaging applications for which the present invention is suited, its teachings may be employed in telecommunications to increase the bandwidth and security of optical communications, both in the civilian and military contexts. The apparatus of the present invention may be combined with fiber optic waveguide networks to provide high-speed mega channel optical data transmission, optical encoding, high-speed Internet and voice telephony. The apparatus and methods of the present invention may be employed to develop encryption and secure communications applications not heretofore possible. Other applications will be apparent to those of skill in the art of the present invention. In certain embodiments, the present invention may also be employed for light-controlled or activated optical chemistry and tissue forming applications.

The embodiments and examples set forth herein are presented to best explain the present invention and its practical application and to thereby enable those skilled in the art to make and use the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A projection device comprising:
   a coherent light beam-generator that generates a light beam;
   a beam expander disposed to receive the light beam and to emit an expanded light beam;
   a digital micro-mirror device disposed to receive a holographic transform of an original image and to display the holographic transform for illumination by the expanded light beam into a holographic light beam;
   a convergent or focusing lens disposed to receive and modulate the holographic light beam;
   a liquid crystal plate volumetric image reconstructor that receives the focused holographic light beam and emits a 3-dimensional holographic image of the original image; and
   wherein the expanded light beam is shifted by less than a width of a mirror on the digital micro-mirror device to enhance a resolution of the 3-dimensional holographic image.

2. The device of claim 1, further comprising:
   two or more colored lasers added such that the three primary colors, red, green and blue, can illuminate the digital micro-mirror device at different portions of the digital micro-mirror with different wavelengths of laser light; and
   the holographic transform comprises different color transforms disposed on the digital micro-mirror device to match the location of the two or more colored lasers to display full color images.

3. The device of claim 2, wherein a rotating wheel with narrow bandwidth filters to select colors from a multispectral light source replaces the two or more colored lasers and to illuminate the digital micro-mirror device disposed with the appropriately synchronized holographic transform to display full color images.

4. The device of claim 1, further comprising:
   two or more digital micro-mirror devices that display individual color displaying holograms based on illumination with different wavelengths of light; and
   two or more colored lasers such that the three primary colors, red, green and blue, illuminate at least one of the two or more digital micro-mirror devices to display multi-colored images.

5. The device of claim 1, wherein
   a non-coherent, white-light beam-generator that generates a light beam; and
   a narrow bandwidth filter disposed to select out of the white light one color with a narrow bandwidth replaces the coherent light beam-generator.

6. The device of claim 5, wherein the non-coherent white-light beam-generator is replaced with a non-coherent or near-coherent diode light beam generator and the narrow bandwidth filter is used with diodes which do not produce that are less than 2% of a central wavelength.

7. The device of claim 1, wherein the liquid crystal volumetric plate image reconstructor is a volumetric display.

8. The device of claim 7, wherein the volumetric display comprises two or more liquid crystal plates.

9. The device of claim 8, wherein the modulation by the one or more liquid crystal plates of the holographic light beam is asynchronous to the holographic transform frame-rate deposition on the digital micro-mirror device.

10. The device of claim 8, wherein the modulation using one or more liquid crystal plates is controlled by a power conditioning circuit to cycle on and off the one or more liquid crystal plates at less than 15 milliseconds to reduce flicker and to provide voltages less than 100% of the rated value to optimize the opacity/translucency of each of the one or more liquid crystal plates.

11. The device of claim 8, wherein the one or more liquid crystal plates are surfaced with anti-reflection coating to improve transmitted intensity.

12. The device of claim 7, wherein the volumetric display comprises a continuous medium in a gel tank.

13. The device of claim 7, wherein the volumetric display comprises one or more frosted plates or translucent sheets which may be translated or rotated.

14. The device of claim 7, wherein the volumetric display comprises a mist, micro-particles or vapor in free space or enclosed in a tank.

15. The device of claim 1, wherein a position or an angle of the expanded light beam is shifted to provide a superimposed image that is shifted from the original image by less than a mirror width for finer resolution.

16. The device of claim 1, wherein a wavelength of the expanded light beam is shifted such that the reconstructed image position is shifted to provide a superimposed image, shifted from the original image by less than a mirror width for finer resolution.

17. The device of claim 1, wherein either the expanded light beam or the digital micro-mirror device is moved by fractions of a resolution spacing of the reconstructed image to provide a superimposed image, shifted from the original image by less than the mirror width for finer resolution.

18. The device of claim 1, wherein a wavelength of expanded light beam is shifted such that the multiple diffraction order dispersion pattern due to the regular spacing of the mirrors of the digital micro-mirror device causes a shift in the reconstructed image by less than a resolution spacing and thus enhances resolution while using the same or different holograms for each of the shifted wavelengths.

19. The device of claim 1, wherein the digital micro-mirror device receives different holograms such that the projected reconstructed 3-dimensional image is shifted by fractions of a basic resolution.

20. The device of claim 1, further comprising one or more lenses, mirrors or combinations thereof whereby the 3-dimensional holographic image is magnified or demagnified.

21. The device of claim 1, wherein at least one of combinations of resizing of the original image and using longer or shorter wavelength are used to dispose a particular magnification or demagnification on the reconstructed of the 3-dimensional holographic image.

22. The device of claim 1, wherein two or more digital micro-mirror devices adjust a depth of focus of different layers in a displayed, three dimensional, holographic reconstructed image.

23. The device of claim 1, wherein two or more digital micro-mirror devices increase the viewing angle or look around angle of the displayed image.

24. The device of claim 1, wherein one or more pixel values of the holographic transform are computed and transcribed to digital micro-mirror device to accommodate for a difference in size of pixels of the digital micro-mirror device and a CCD camera.

25. The device of claim 1, wherein the holographic transform is synthesized by the addition of two or more recorded holograms of individual layers of three dimensional scenes on the digital micro-mirror device.

26. A projection device comprising:
a coherent light beam-generator that generates a light beam;
a beam expander disposed to receive the light beam and to emit an expanded light beam;
a digital micro-mirror device disposed to receive a holographic transform of an original image and to display the holographic transform for illumination by the expanded light beam into a holographic light beam;
a convergent or focusing lens disposed to receive and modulate the holographic light beam;
a liquid crystal plate volumetric image reconstructor that receives the focused holographic light beam and emits a 3-dimensional holographic image of the original image; and
wherein the holographic transform is resized to a size smaller or larger than the original image and imaged to a surface of the digital micro-mirror device to produce the 3-dimensional holographic image that is larger or smaller than the original image when illuminated with the same wavelength of light of the original image.

27. The device of claim 26, wherein:
the liquid crystal volumetric plate image reconstructor is a volumetric display; and
the volumetric display comprises two or more liquid crystal plates, a continuous medium in a gel tank, one or more frosted plates or translucent sheets which may be translated or rotated, or a mist, micro-particles or vapor in free space or enclosed in a tank.

28. A projection device comprising:
a coherent light beam-generator that generates a light beam;
a beam expander disposed to receive the light beam and to emit an expanded light beam;
a digital micro-mirror device disposed to receive a holographic transform of an original image and to display the holographic transform for illumination by the expanded light beam into a holographic light beam;
a convergent or focusing lens disposed to receive and modulate the holographic light beam;
a liquid crystal plate volumetric image reconstructor that receives the focused holographic light beam and emits a 3-dimensional holographic image of the original image; and
wherein the holographic transform disposed to the digital micro-mirror device is illuminated with a wavelength of light longer or shorter than a wavelength used to produce the original image in order to produce the 3-dimensional holographic image which is larger or smaller than an original object recorded in the original image.

29. The device of claim 28, wherein:
the liquid crystal volumetric plate image reconstructor is a volumetric display; and
the volumetric display comprises two or more liquid crystal plates, a continuous medium in a gel tank, one or more frosted plates or translucent sheets which may be translated or rotated, or a mist, micro-particles or vapor in free space or enclosed in a tank.

30. A projection device comprising:
a coherent light beam-generator that generates a light beam;
a beam expander disposed to receive the light beam and to emit an expanded light beam;
a digital micro-mirror device disposed to receive a holographic transform of an original image and to display the holographic transform for illumination by the expanded light beam into a holographic light beam;
a convergent or focusing lens disposed to receive and modulate the holographic light beam;

a liquid crystal plate volumetric image reconstructor that receives the focused holographic light beam and emits a 3-dimensional holographic image of the original image; and wherein the digital micro-mirror device is illuminated at a widest grating dispersion angle to enable larger viewing because of an increase in distance between multiple diffraction orders as an illumination angle increases.

31. The device of claim 30, wherein:

the liquid crystal volumetric plate image reconstructor is a volumetric display; and the volumetric display comprises two or more liquid crystal plates, a continuous medium in a gel tank, one or more frosted plates or translucent sheets which may be translated or rotated, or a mist, micro-particles or vapor in free space or enclosed in a tank.

32. A projection device comprising:

a coherent light beam-generator that generates a light beam;

a beam expander disposed to receive the light beam and to emit an expanded light beam;

a digital micro-mirror device disposed to receive a holographic transform of an original image and to display the holographic transform for illumination by the expanded light beam into a holographic light beam;

a convergent or focusing lens disposed to receive and modulate the holographic light beam;

a liquid crystal plate volumetric image reconstructor that receives the focused holographic light beam and emits a 3-dimensional holographic image of the original image; and wherein a focal length of the convergent or focusing lens displays only one complex conjugate wave images from a pair of complex conjugate wave images produced by the hologram, selected such that the convergent or focusing lens will focus one image at a desired distance and focus the other image at a relatively infinite distance.

33. The device of claim 32, wherein:

the liquid crystal volumetric plate image reconstructor is a volumetric display; and the volumetric display comprises two or more liquid crystal plates, a continuous medium in a gel tank, one or more frosted plates or translucent sheets which may be translated or rotated, or a mist, micro-particles or vapor in free space or enclosed in a tank.

34. A projection device comprising:

a coherent light beam-generator that generates a light beam;

a beam expander disposed to receive the light beam and to emit an expanded light beam;

a digital micro-mirror device disposed to receive a holographic transform of an original image and to display the holographic transform for illumination by the expanded light beam into a holographic light beam;

a convergent or focusing lens disposed to receive and modulate the holographic light beam;

a liquid crystal plate volumetric image reconstructor that receives the focused holographic light beam and emits a 3-dimensional holographic image of the original image; and wherein an optimal distance of a holographic plane from the digital micro-mirror device, used to record or compute holograms, is determined such that no overlap in multiple scenes can be observed.

35. The device of claim 34, wherein:

the liquid crystal volumetric plate image reconstructor is a volumetric display; and the volumetric display comprises two or more liquid crystal plates, a continuous medium in a gel tank, one or more frosted plates or translucent sheets which may be translated or rotated, or a mist, micro-particles or vapor in free space or enclosed in a tank.

36. A projection device comprising:

a coherent light beam-generator that generates a light beam;

a beam expander disposed to receive the light beam and to emit an expanded light beam;

a digital micro-mirror device disposed to receive a holographic transform of an original image and to display the holographic transform for illumination by the expanded light beam into a holographic light beam;

a convergent or focusing lens disposed to receive and modulate the holographic light beam;

a liquid crystal plate volumetric image reconstructor that receives the focused holographic light beam and emits a 3-dimensional holographic image of the original image; and wherein multiple diffraction order scenes are removed from reconstructed images by manufacturing the digital micro-mirror device with mirrors positioned in irregular patterns, which includes at least one of non-parallel rows, columns or missing mirrors.

37. The device of claim 36, wherein:

the liquid crystal volumetric plate image reconstructor is a volumetric display; and the volumetric display comprises two or more liquid crystal plates, a continuous medium in a gel tank, one or more frosted plates or translucent sheets which may be translated or rotated, or a mist, micro-particles or vapor in free space or enclosed in a tank.

38. A projection device comprising:

a coherent light beam-generator that generates a light beam;

a beam expander disposed to receive the light beam and to emit an expanded light beam;

a digital micro-mirror device disposed to receive a holographic transform of an original image and to display the holographic transform for illumination by the expanded light beam into a holographic light beam;

a convergent or focusing lens disposed to receive and modulate the holographic light beam;

a liquid crystal plate volumetric image reconstructor that receives the focused holographic light beam and emits a 3-dimensional holographic image of the original image; and a hologram recording system coupled to the projection device by land-line or airwaves, wherein the hologram recording system comprises a CCD camera or similar digital recording device to feed the holographic transform via a computer to the digital micro-mirror device, wherein information of three dimensional scenes is disposed to the CCD camera by selectively recording depth information using a reference beam to modulate time-selection at the desired depth of scene during hologram capture.

39. A projection device comprising:

a coherent light beam-generator that generates a light beam;

a beam expander disposed to receive the light beam and to emit an expanded light beam;

a digital micro-mirror device disposed to receive a holographic transform of an original image and to display the holographic transform for illumination by the expanded light beam into a holographic light beam;

a convergent or focusing lens disposed to receive and modulate the holographic light beam;

a liquid crystal plate volumetric image reconstructor that receives the focused holographic light beam and emits a 3-dimensional holographic image of the original image; and a hologram recording system coupled to the projection device by land-line or airwaves, wherein the hologram recording system comprises a CCD camera or similar digital recording device to feed the holographic transform via a computer to the digital micro-mirror device, wherein different wavelengths of coherent light are used to display the 3-dimensional holographic image than the wavelengths used to record the holographic transform of the original image.

40. The device of claim 39, wherein the recording device records holograms at wavelengths, either sonic or electromagnetic, longer than visible wavelengths and the holographic transforms are disposed to the digital micro-mirror device, wherein the digital micro-mirror device is illuminated with narrowband visible light and the image is reconstructed at a de-magnified size relative to the original scene.

41. The device of claims 40, further comprising:

one or more lenses, mirrors or combinations thereof, wherein the 3-dimensional holographic reconstructed image is magnified or demagnified; and wherein combinations of resizing of the hologram and using longer or shorter illumination wavelengths are used to dispose a magnification or de-magnification on the reconstructed image.

42. The device of claim 39, wherein the recording device records holograms at wavelengths, either deBroglie or electromagnetic, shorter than visible wavelengths and the holographic transforms are disposed to the digital micro-mirror device, wherein the digital micro-mirror device is illuminated with narrowband visible wavelength light and the image is reconstructed at a magnified size relative to the original scene.

43. The device of claim 39, wherein the different wavelengths of coherent light are used to accommodate for a difference in size of pixels of the digital micro-mirror device and the CCD camera.

44. A projection device comprising:

a coherent light beam-generating device that produces one or more expanded light beams;

a digital micro-mirror device connected to a processor to display a holographic transform of an original image thereon and disposed to receive and reflect the expanded light beam into a holographic light beam;

a convergent or focusing lens disposed to receive and modulate the holographic light beam; and a Rhodopsium or similar type material reconstructor that (a) is imprinted with one or more holograms at a finer resolution by using the digital micro-mirror device and the imprinted holograms are erased by another laser beam, and (b) receives the focused holographic light beam and modulates the holographic light beam to emit a 3-dimensional holographic image of the original image from the imprinted holograms at video rate.

45. A 3D display device comprising:

a coherent light beam-generator that generates a light beam;

a beam expander disposed to receive the light beam and to emit an expanded light beam; and a digital micro-mirror device disposed to receive a holographic transform of an original image and to display the holographic transform for illumination by the expanded light beam into a holographic light beam onto one or more frosted plates or translucent sheets which may be translated or rotated, wherein the human eye perceives a 3-dimensional holographic image of the original image in the holographic light beam.

46. A method of creating a hologram comprising:

generating an expanded light beam;

disposing a pattern derived from an original image or model on a surface of a digital micro-mirror device disposed to receive the expanded light beam;

generating a modulated light pattern;

varying an intensity of the modulated light pattern to compensate for a loss of intensity as the modulated light pattern traverses multiple layers in a liquid crystal volumetric plate image reconstructor; and focusing the modulated light pattern using a convergent or focusing lens onto the liquid crystal volumetric plate image reconstructor to create a 3-dimensional holographic color image of the original image.

47. The method of claim 46, further comprising the step of computing the hologram in real time using pre-computed algorithm terms to update the position of existing objects in the 3D scene, add new objects to the 3D scene, and update the assembled hologram to generate the new 3D scene or a combination thereof, to dispose the hologram on the digital micro-mirror device.

48. The method of claim 46, further comprising the step of encoding the hologram into an image format and varying an image format brightness and an image format contrast such that higher intensity reconstructed 3D images are projected.

49. The method of claim 46, further comprising the steps of:

computing the hologram utilizing mathematical methods of a series of complex exponentials such that theorems for fast computer summations can be employed for reduced calculation times; and using FFTs as intermediate steps in the hologram calculations in relation to the digital micro-mirror device.

50. The method of claim 46, further comprising the step of computing the hologram to display the 3-dimensional holographic color image by compensating for diffraction dispersion shifts by wavelength (color) of the regular-patterned digital micro-mirror device.

51. The method of claim 46, further comprising the step of computing the hologram by modulating intensities and spatial size variations on each layer of the three dimensional holographic color image in order to display the projected 3D image with true image depth cues.

52. The method of claim 46, further comprising the step of modulating intensities and spatial size variations of each layer in the three dimensional holographic color image to display virtual images with all the depth cues required to perceive true depth.

53. The method of claim 46, further comprising the step of shifting the expanded light beam by less than a width of a mirror on the digital micro-mirror device to enhance a resolution of the 3-dimensional holographic image.

54. The method of claim 46, further comprising the step of resizing the holographic transform to a size smaller or larger than the original image and imaged to a surface of the digital micro-mirror device to produce the 3-dimensional holographic image that is larger or smaller than the original image when illuminated with the same wavelength of light of the original image.

55. The method of claim 46, further comprising the step of illuminating the holographic transform disposed to the digital micro-mirror device with a wavelength of light longer or shorter than a wavelength used to produce the original image in order to produce the 3-dimensional holographic image which is larger or smaller than an original object recorded in the original image.

56. The method of claim 46, wherein a focal length of the convergent or focusing lens displays only one complex conjugate wave images from a pair of complex conjugate wave images produced by the hologram, selected such that the convergent or focusing lens will focus one image at a desired distance and focus the other image at a relatively infinite distance.

57. The method of claim 46, wherein:
the liquid crystal volumetric plate image reconstructor is a volumetric display; and
the volumetric display comprises two or more liquid crystal plates, a continuous medium in a gel tank, one or more frosted plates or translucent sheets which may be translated or rotated, or a mist, micro-particles or vapor in free space or enclosed in a tank.

* * * * *